July 27, 1965  L. AXTHAMMER  3,197,191
PRESSURE APPARATUS AND MEANS FOR CHARGING THE
SAME WITH A PRESSURE FLUID
Filed Nov. 2, 1962

3,197,191
PRESSURE APPARATUS AND MEANS FOR CHARGING THE SAME WITH A PRESSURE FLUID
Ludwig Axthammer, Schweinfurt (Main), Germany, assignor to Fichtel & Sachs Aktiengesellschaft, Schweinfurt (Main), Germany
Filed Nov. 2, 1962, Ser. No. 234,920
Claims priority, application Germany, Nov. 29, 1961, F 35,427
5 Claims. (Cl. 267—64)

This invention relates to pressure apparatus and to apparatus for charging the same with a pressure fluid.

More particularly, the invention relates to hydraulic-pneumatic shock absorbers suitable for use in motor vehicles and to apparatus for injecting a pneumatic medium into the same.

In known shock absorbers of the above indicated type, the pneumatic medium is generally charged into the related cylinder by complicated and expensive inlet valves or through inlet bores provided for this purpose.

It is an object of the invention to provide an improved hydraulic-pneumatic shock absorber eliminating the requirement for special inlet valves and bores such as are normally provided for the injection of a pneumatic medium.

According to the invention, a shock absorber structure is provided wherein the open end of a cylinder is closed by a cylindrical closure defining with the cylinder an annular passage which is sealed by a packing ring.

According to a characteristic feature of the invention, this packing ring is accommodated in a specially shaped groove in the closure which enables the ring to be displaced to an inactive position when a pneumatic medium is being charged into the cylinder whereas the packing ring assumes a sealing position and function when the operation of charging the pneumatic medium into the cylinder has been terminated.

According to the invention, no additional valve parts or bores are required inasmuch as the packing ring operates both as a check valve and as a sealing device.

In accordance with a further characteristic feature of the invention, there is provided apparatus for use in combination with the above-noted shock absorber structure for charging the same with a pressure medium.

Accordingly, objects of the invention relate not only to improved shock absorbers and like structures, but as well to improved means for injecting a pressure medium into the same and to improved combinations of the pressure medium charging device and the device charged thereby.

Figure 1:
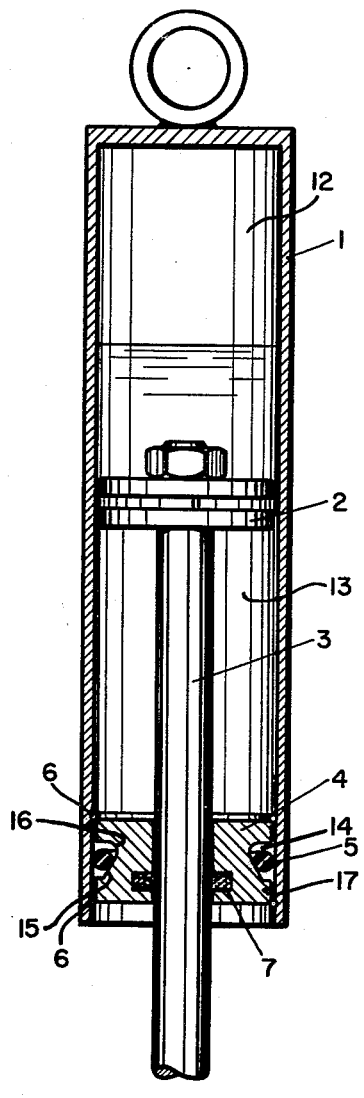
Figure 2:
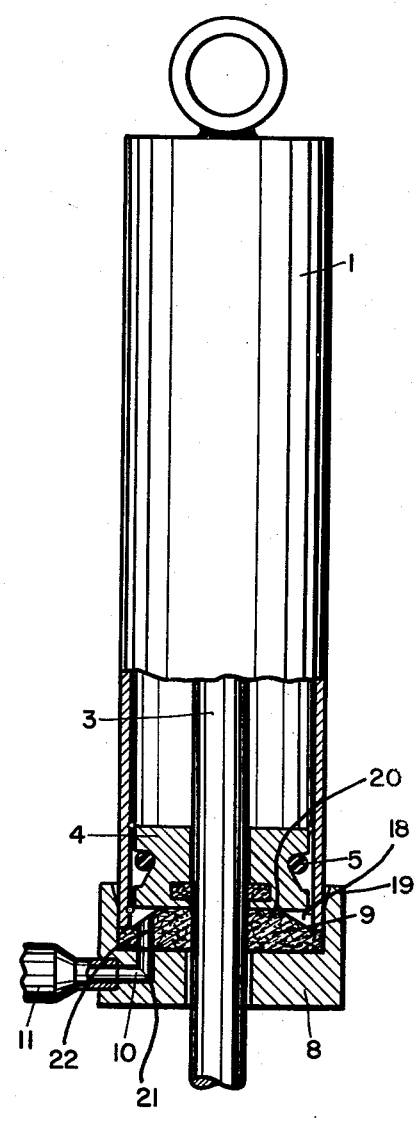

Other objects, as well as advantages and features of the invention, will be found in the following detailed description of a preferred embodiment of the invention as illustrated in the accompanying drawing in which:

FIGURE 1 is an axial cross-section of the cylinder and closure device of a shock absorber provided in accordance with the invention with an equalizer piston shown therein; and FIGURE 2 is a side view of the shock absorber of FIG. 1, partially broken away and illustrating in section an apparatus for injecting a pressure medium into the same.

The apparatus shown in the drawing comprises generally a cylinder 1, an equalizer piston 2 and a piston rod 3.

The cylinder 1 defines an open end obturated by means of a cylindrical closure device 4 which defines an annular passage with the cylinder 1. A seal is provided between the closure device 4 and the cylinder 1 by a packing ring 5. The closure device 4 is secured in position by means of locking rings 6 which are capable of mechanically retaining the closure device 4 in position but which are incapable of providing a pressure-tight seal.

Piston rod 3 is slidable through an axial bore provided in closure device 4 wherein a pressure-tight seal is effected by means of a gasket 7.

Generally, the pressure medium injecting device provided by the invention comprises a cover or base 8, a gasket or packing 9, a bore 10 and a pressure medium source 11 (shown in part).

More particularly, piston 2 divides the cylinder into a hydraulic chamber 12 and a pneumatic chamber 13, the latter of which is to be charged with a pneumatic pressure medium in accordance with the provisions of the invention.

To this end the packing ring 5 is accommodated within a specially provided groove 14 as aforesaid.

Groove 14 deepens in an axial direction toward the interior of the cylinder 1. It therefore has a shallow portion generally indicated at 15 and a deep portion generally indicated at 16. The axial extent of groove 14 is greater than the cross-sectional diameter of ring 5 so as to permit an axial displacement of ring 5 in the groove.

The ring 5 is elastic and preferably has a diameter which is somewhat less than that of the closure device 4 in the vicinity of the deep portion 16 of groove 14. This assures that when the ring 5 is moved towards the deep portion 16 it contracts and thus frees the annular passage which is generally indicated by reference character 17.

In FIG. 2 it will be generally noted that the closure device 4 is inserted entirely within the cylinder 1 which therefore extends beyond the closure device 4 and defines a space 18. It will also be noted that the base 8 comprises an upwardly extending flange 19 which is of cylindrical form and which is adapted to accommodate the lowermost extremity of cylinder 1.

The packing 9 accommodated within the opening of base 8 defined by flange 19 yieldably and elastically accommodates the lowermost extremity of cylinder 1 and effectively provides a pressure-tight seal therewith. Packing 9 furthermore includes a central protrusion 20 which extends into the cylinder and against the closure device 4.

The aforenoted bore 10 includes a section 21 extending through base 8 and a section 22 extending from section 21 such that a pneumatic medium introduced from source 11 passes into space 18 adjacent annular passage 17.

In operation, the pneumatic pressure medium entering space 18 and passing into annular passage 17 forces ring 5 axially upward and the ring 5 contracts in the specially provided groove 14 so as to leave a free passage for the pneumatic medium to enter chamber 13. When, however, the pressure of source 11 is terminated, pressure in chamber 13 causes ring 5 to move axially downward in groove 14 which when in position at shallow portion 15 is in a position to engage with cylinder 1 and thereby provide a pressure-tight seal.

In view of the improvements noted above, it will now be clear that the ring 5 performs the function of acting as a pressure-tight seal which locks a pneumatic medium in chamber 13 and of an inlet valve which permits the one-way flow of a pressure medium into the latter said chamber.

Accordingly, the invention provides a structure whereby in complicated valves and bores need not be provided in the afore-described types of shock absorber structure.

There will now be obvious to those skilled in the art many modifications and variations of the structures set forth above. These modifications and variations will not, however, depart from the scope of the invention if defined by the following claims.

What is claimed is:

1. Apparatus comprising a cylinder defining an enclosure with an opening to ambient atmosphere, a piston in said cylinder dividing said enclosure into two chambers one of which is provided with said opening, the other of said chambers containing a fluid, a cylindrical closure in fixedly secured relation in said opening and substantially obturating said opening but defining with said cylinder a passage connecting said one chamber with ambient atmosphere, said closure being provided with an annular groove coaxial with said cylinder, said groove deepening towards the interior of the cylinder and having a shallow portion and a deep portion, and an elastic packing ring encircling said closure in said groove and having a diameter which is no greater than that of the closure at the deep portion of the groove, said groove having an axial extent greater than that of the ring to accommodate axial movement of the ring, said ring being displaceable from a first position at the shallow portion of the groove whereat said ring is sandwiched against said cylinder to seal said passage, to a second position at the deep portion of the groove whereat said ring is spaced from said cylinder and said passage is opened, said ring being displaceable from said first position to said second position by the directing of a pressure medium through said passage toward said enclosure and being displaceable by the pressure medium in the enclosure from the second position to the first position to seal the pressure medium in the enclosure.

2. Apparatus as claimed in claim 1 comprising locking rings locking said closure in position in said cylinder.

3. Apparatus as claimed in claim 1 wherein said ring is an O ring.

4. Apparatus comprising a cylinder defining an enclosure with an opening to ambient atmosphere, a piston in said cylinder dividing said enclosure into two chambers one of which is provided with said opening, the other of said chambers containing a fluid, a cylindrical closure in fixedly secured relation in said opening and substantially obturating said opening but defining with said cylinder a passage connecting said one chamber with ambient atmosphere, said closure being provided with an annular groove coaxial with said cylinder, said groove deepening towards the interior of the cylinder and having a shallow portion and a deep portion, an elastic packing ring encircling said closure in said groove and having a diameter which is no greater than that of the closure at the deep portion of the groove, said groove having an axial extent greater than that of the ring to accommodate axial movement of the ring, said ring being displaceable from a first position at the shallow portion of the groove whereat said ring is sandwiched against said cylinder to seal said passage, to a second position at the deep portion of the groove whereat said ring is spaced from said cylinder and said passage is opened, said ring being displaceable from said first position to said second position by the directing of a pressure medium through said passage toward said enclosure and being displaceable by the pressure medium in the enclosure from the second position to the first position to seal the pressure medium in the enclosure, said cylinder extending beyond said enclosure, a base having an opening and receiving said cylinder, and packing means in said base to cushion and form a seal with the cylinder, said base and packing means having a bore extending to a position adjacent said passage and adapted for receiving a supply of a pressure medium for charging said one chamber with said pressure medium.

5. Apparatus as claimed in claim 4 wherein said packing means includes a central protrusion extending into the cylinder against said closure, the apparatus further comprising means for supplying a pressure medium to said bore.

References Cited by the Examiner

UNITED STATES PATENTS

| | | | |
|---|---|---|---|
| 2,530,504 | 11/50 | Boyer | 258—9 |
| 2,708,573 | 5/55 | Rovoldt | 267—1 |
| 2,740,625 | 4/56 | Taylor | 267—64 |
| 2,882,592 | 4/59 | De Carbon | 188—88 X |
| 2,930,608 | 3/60 | Hogan et al. | 188—100 |
| 2,939,696 | 6/60 | Tuczek | 267—64 |
| 2,949,244 | 8/60 | Phillipe | 285—9 X |
| 2,977,111 | 3/61 | Tuczek | 188—100 |
| 3,024,044 | 3/62 | Benevento | 284—19 |
| 3,139,159 | 6/64 | Lab | 267—64 |

FOREIGN PATENTS 125,848   11/47   Australia.

EUGENE G. BOTZ, *Primary Examiner.*

ARHTUR L. LA POINT, *Examiner.*